(12) United States Patent
Wilson et al.

(10) Patent No.: US 6,385,735 B1
(45) Date of Patent: May 7, 2002

(54) METHOD AND APPARATUS FOR LIMITING PROCESSOR CLOCK FREQUENCY

(75) Inventors: James A. Wilson; Robert F. Netting; Peter Des Rosier, all of Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/990,526

(22) Filed: Dec. 15, 1997

(51) Int. Cl.[7] ................................................ G06F 1/04
(52) U.S. Cl. ...................................... 713/501; 713/601
(58) Field of Search ................................ 713/500, 501, 713/503, 601

(56) References Cited

U.S. PATENT DOCUMENTS

| | | | | |
|---|---|---|---|---|
| 5,642,388 A | * | 6/1997 | Evoy | 375/376 |
| 5,684,434 A | * | 11/1997 | Mann et al. | 331/16 |
| 5,734,274 A | * | 3/1998 | Gavish | 327/48 |
| 5,774,703 A | * | 6/1998 | Weiss et al. | 713/501 |
| 5,875,388 A | * | 2/1999 | Daughtry, Jr. et al. | 455/67.1 |
| 6,101,319 A | * | 8/2000 | Hall | 395/183.18 |

* cited by examiner

Primary Examiner—Dennis M. Butler
(74) Attorney, Agent, or Firm—Antonelli, Terry, Stout & Kraus, LLP

(57) ABSTRACT

A method and apparatus for limiting a processor clock frequency includes an overclocking prevention circuit. The overclocking prevention circuit includes a frequency limiting circuit having programmable fusible elements. The frequency limiting circuit outputs a signal identifying a maximum processor clock frequency based on the state of each of the fusible elements. A comparator circuit compares a selected processor clock frequency to the maximum processor clock frequency to determine if the selected processor clock frequency is permitted. If the selected processor clock frequency is not permitted, then the processor is not allowed to operate at the selected clock frequency.

16 Claims, 6 Drawing Sheets

| ENTRY | FREQ. LIMIT FUSE BIT VALUES | LIMIT @66MHz | LIMIT @100MHz |
|---|---|---|---|
| 1 | 0000 | NO LIMIT | NO LIMIT |
| 2 | x111 | 1/4 (266) | HALT |
| 3 | x101, x011 | 2/9 (300) | 1/3 (300) |
| 4 | x001, x110 | 1/5 (333) | 2/7 (350) |
| 5 | x001, x110 | 1/5 (333) | 2/7 (350) |
| 6 | x010 | 2/11 (366) | 2/7 (350) |
| 7 | x010 | 2/11 (366) | 2/7 (350) |
| 8 | 1000 | 2/11 (366) | 2/9 (450) |
| 9 | x100 | 2/11 (366) | 1/4 (400) |
| 10 | 1000 | 2/11 (366) | 2/9 (450) |

FIG. 6

METHOD AND APPARATUS FOR LIMITING PROCESSOR CLOCK FREQUENCY

BACKGROUND OF THE INVENTION

The present invention relates to processor clock circuits, and more particularly, to a method and apparatus for limiting a processor clock frequency.

Processor manufacturers perform various tests to rate each processor for a particular clock frequency. Tests are typically performed at the wafer level, and also at the chip level. More restrictive tests can also be performed at the card level by subjecting the processor to the constraints of memory and other devices. Based on these tests, the manufacturer can determine the maximum clock speed at which the processor can operate without errors. However, many electronics manufacturers are very conservative in their clock ratings. For example, a processor that successfully operates during tests at 166 MHz may be rated at only 120 MHz.

Moreover, there is a demand for processors across a wide variety of clock frequencies. As a result, manufacturers typically intentionally rate processors at frequencies that are significantly lower than the processor's maximum clock frequency to meet demand for processors at a particular frequency. For example, even though 80% of a manufacturer's processors may operate correctly at 300 MHz, many of these processors will be marked and sold by manufacturers as slower processors (e.g., 133, 150, 166, 200 and 250 MHz) due to market demand for processors across a wide variety of clock frequencies.

Because most processors can be clocked at frequencies significantly greater than their rated (marked) clock frequency, there is presently a problem with resellers and distributors remarking processors with a higher frequency and then selling the processors as the higher speed part to charge a higher price. This is possible because the processor clock speed is typically initialized from the motherboard at reset. One or more jumpers on the motherboard can be set to select a processor clock frequency. At system reset, the motherboard outputs frequency selecting control signals to the processor to select a processor clock frequency. At reset, the processor samples these frequency selecting control signals. The clock generation logic in the processor then performs the appropriate frequency multiplication and division on the external clock signal provided from the motherboard to generate the selected processor clock frequency. This allows unscrupulous processor resellers to purchase less expensive processors that are rated at lower clock frequencies and then remark the processors to a higher clock frequency. This also allows personal computer manufacturers to overclock these processors (operate the processor at a clock frequency greater than the originally rated frequency) once they are installed in personal computers.

There have been attempts to solve the overclocking problem. According to one approach, a maximum processor clock frequency is selected by tying several processor input pins high or low using pull-up and pull-down resistors. However, this hardwiring approach to setting a maximum clock frequency is susceptible to external manipulation by users and resellers. A user can reconnect these processor input pins to high or low to select a different clock frequency. As a result, this hardwiring approach is not secure. Moreover, the hardwiring approach is inflexible and cumbersome for processor manufacturers because the maximum clock frequency can be adjusted only by resoldering the pull-up and pull-down resistors. A more flexible approach is desirable.

Therefore, a need exists for a more secure mechanism that prevents resellers and users from operating the processors at clock frequencies that are greater than their rated clock frequencies, while providing a flexible technique to allow processor manufacturers to more easily adjust the maximum clock frequency.

SUMMARY OF THE INVENTION

A method and apparatus is disclosed for limiting a processor clock frequency. The apparatus includes a frequency limiting circuit including one or more programmable fusible elements. The frequency limiting circuit outputs a signal identifying a maximum processor clock frequency based on the state of each of the fusible elements. The apparatus also includes a comparator circuit coupled to the frequency limiting circuit. The comparator circuit receives a signal identifying a selected processor clock frequency as a first input and receives the signal identifying the maximum processor clock frequency as a second input. The comparator circuit outputs a signal indicating whether or not the selected processor clock frequency is greater than the maximum clock frequency.

DETAILED DESCRIPTION

Figure 1:
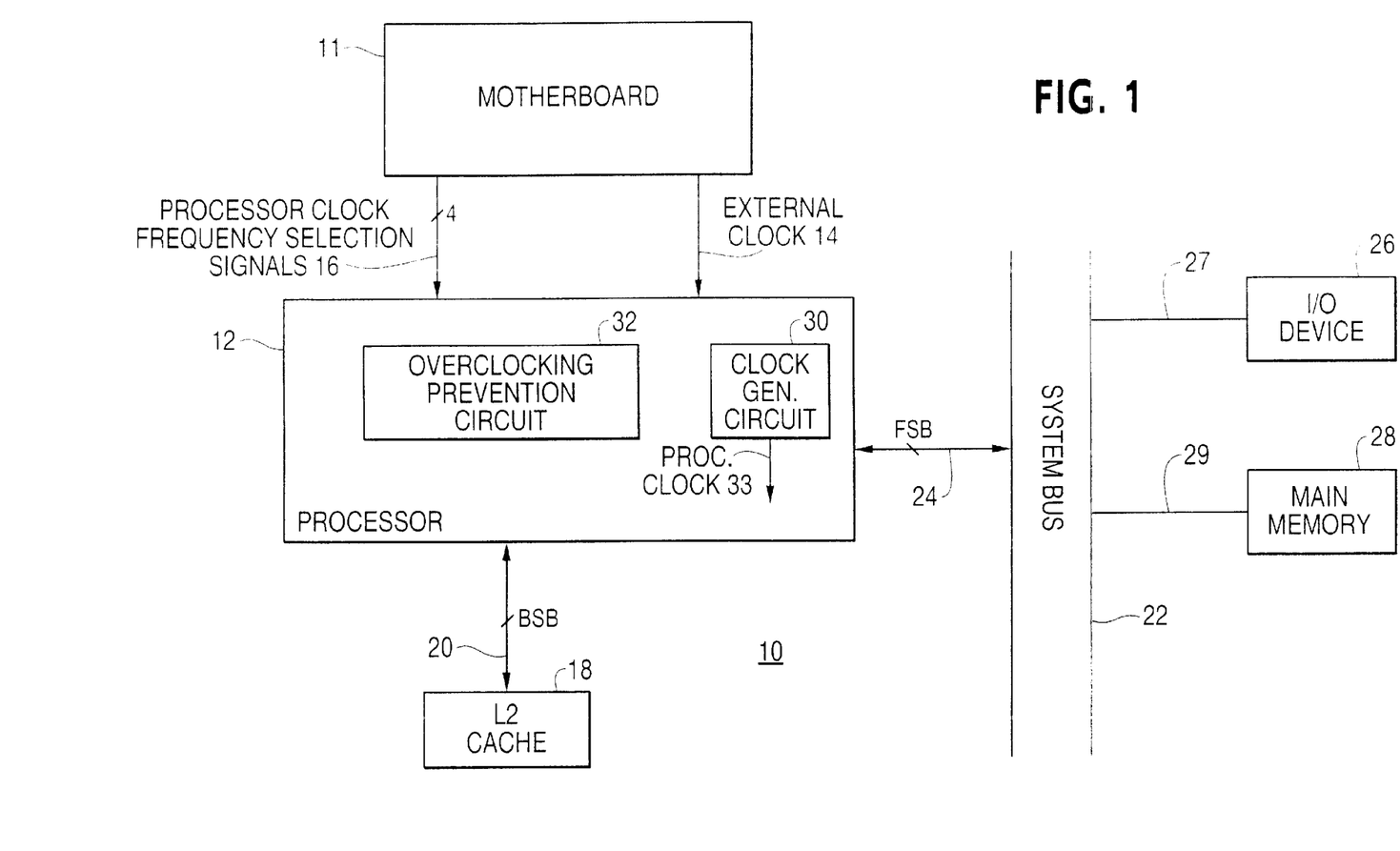
FIG. 1 illustrates a block diagram of a computer according to an embodiment of the present invention.

Referring to the figures in which like numerals indicate like elements, FIG. 1 illustrates a block diagram of a computer according to an embodiment of the present invention. Computer 10 includes a motherboard 11 that is connected to a processor 12 via an external clock 14 and processor clock frequency selection signals 16. External clock signal 14 is generated by motherboard 11 at a predetermined clock frequency. One or more jumpers on motherboard 11 may be set to select a particular processor clock frequency. The processor clock frequency selection signals 16 are output as digital signals at reset by motherboard 11 to identify the selected maximum processor clock frequency to processor 12. During reset, processor 12 samples processor clock frequency selection signals 16. Other techniques can be used to select a processor clock frequency. For example, the processor clock frequency can be set using the Basic Input Output System (BIOS) software.

Processor 12 is coupled to a Cache 18 via a back side bus (BSB) 20. Processor 12 is also coupled to a system bus 22 via a front side bus (FSB) 24. System bus 22 is coupled to an input/output (I/O) device 26 via line 27, and to a main memory 28 via line 29. FSB 24 includes address, data and control signals. Although not shown in FIG. 1, external clock 14 and processor clock frequency selection signals 16 are provided from motherboard 11 to processor 12 via FSB 24.

Processor 12 includes a clock generation circuit 30 and an overclocking prevention circuit 32. Clock generation circuit 30 includes frequency dividing and multiplying circuits to generate a processor clock 33. Clock generation circuit 30 receives external clock 14 and processor clock frequency selection signals 16 as inputs, and generates processor clock 33. Processor clock 33 is used internally by the processor 12 to clock various processor circuits. The external clock 14 is provided at a predetermined frequency.

Clock generation circuit 30 generates processor clock 33 based on the external clock 14 and the processor clock frequency selection signals 16. For example, if processor clock frequency selection signals 16 specify a processor clock frequency of 200 MHz and external clock 14 is 100 MHz, then clock generation circuit 30 uses a frequency multiplier to multiply the external clock 14 by two to obtain the 200 MHz processor clock 33.

Processor clock frequency selection signals 16 (as digital signals) can specify either a particular clock frequency (e.g., 200 MHz). Alternatively, the frequency of processor clock 33 is specified by the processor clock frequency selection signals 16 as the ratio of the frequency of the external clock 14 to the frequency of the processor clock 33 (e.g., 100/200 or ½ in this example).

Figure 2:
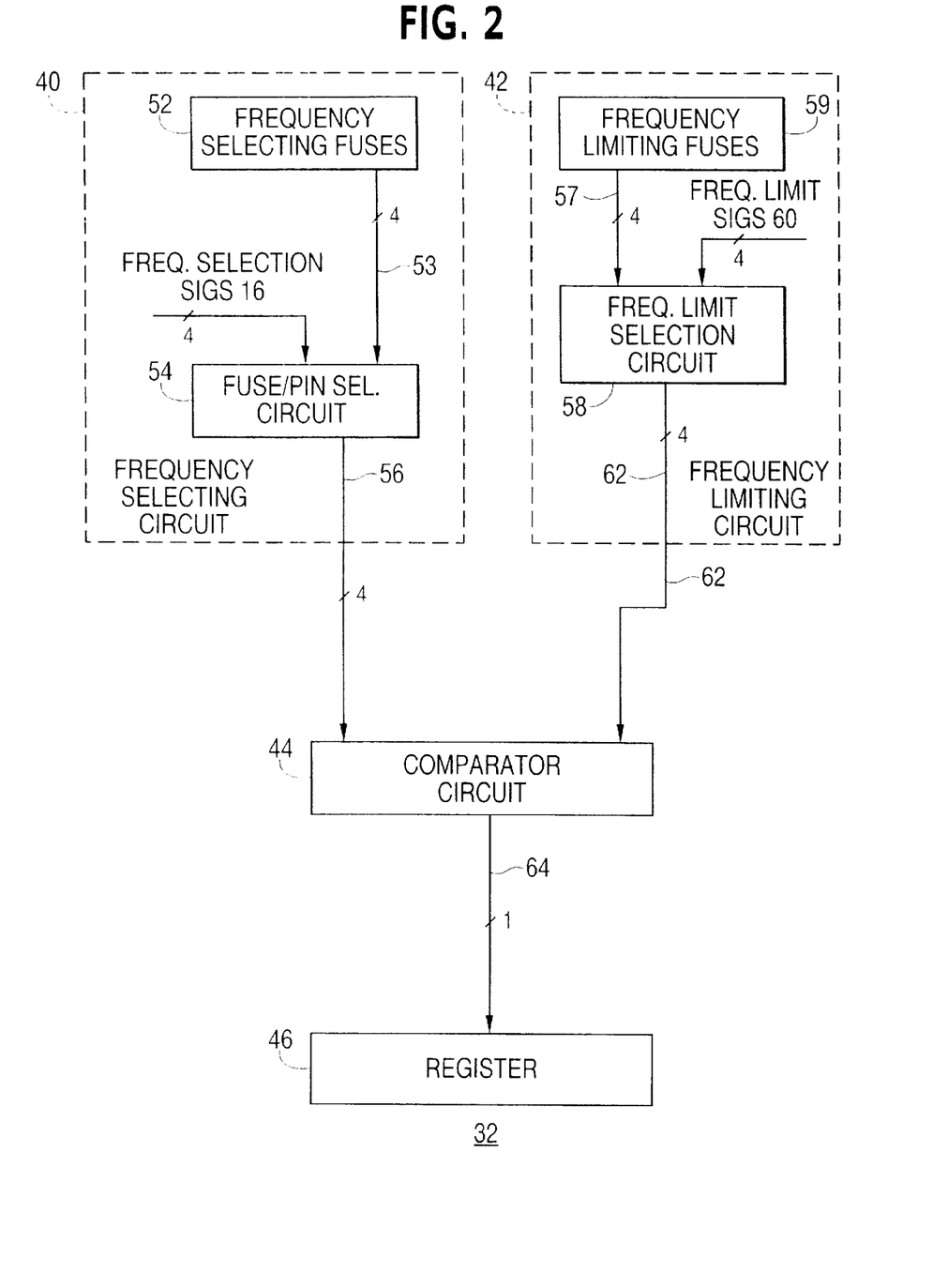
FIG. 2 illustrates a block diagram of the overclocking prevention circuit of FIG. 1 according to an embodiment of the present invention.

FIG. 2 illustrates a block diagram of the overclocking prevention circuit of FIG. 1 according to an embodiment of the present invention. Overclocking prevention circuit 32 includes a frequency selecting circuit 40, a frequency limiting circuit 42, a comparator circuit 44 and a register 46.

Frequency selecting circuit 40 operates to select a processor clock frequency. Frequency selecting circuit 40 includes one or more programmable polysilicon fusible elements (frequency selecting fuses) 52 that can be programmed to select a processor clock frequency. According to one embodiment of the present invention, there are four frequency selecting fuses 52. According to an embodiment of the present invention, each fuse 52 outputs a high (or "1") when programmed (blown), and a low (or "0") when not programmed. The data from fuses 52 are connected to fuse/pin selection circuit 54 via line 53. Processor clock frequency selection signals 16 from motherboard 11 are also input to fuse/pin selection circuit 54. The frequency selection signals 16 and the data output from fuses 52 are used by fuse/pin selection circuit 54 to select a processor clock frequency. Fuse/pin selection circuit 54 outputs the selected processor clock frequency on line 56 to comparator circuit 44. However, frequency selecting circuit 40 is optional. In an alternative embodiment of overclocking prevention circuit 32 (where circuit 40 is not present), frequency selection signals 16 are input directly to comparator circuit 44.

According to one embodiment of frequency selection circuit 40, fuse/pin selection circuit 54 selects and outputs the data from frequency selection fuses 52 if any of fuses 52 have been programmed (blown). Otherwise (if no fuses 52 are programmed), fuse/pin selection circuit 54 selects and outputs the data received from frequency selection signals 16. One or more of fuses 52 can be programmed by an electronics manufacturer (as an example) to select a processor clock frequency for processor 12. However, if no clock frequency is selected using fuses 52 (e.g., none of fuses 52 are programmed), then a PC manufacturer or a user is free to select a processor clock frequency via frequency selection signals 16 (e.g., by connecting the jumpers on motherboard 11 to select the maximum clock frequency, or by using the BIOS). However, as described in greater detail below, overclocking prevention circuit 32 limits the operation of processor 12 to a permissible range of clock frequencies (e.g., to a frequency that is less than or equal to the maximum clock frequency).

Frequency limiting circuit 42 includes one or more programmable polysilicon fusible elements (frequency limiting fuses) 59 and a frequency limit selection circuit 58. According to an embodiment of the present invention, there are four frequency limiting fuses 59. Frequency limiting fuses 59 can be programmed (blown) to select a maximum processor clock frequency. According to an embodiment of the present invention, each fuse 59 outputs a logic high ("1") when programmed (blown), and a low ("0") when not programmed. Frequency limit selection circuit 58 receives data from frequency limiting fuses 59 over line 57. Four frequency limit signals 60 are also input to frequency limit selection circuit 58. However, any number of signals 60 can be used. According to an embodiment of the present invention, frequency limit signals 60 are generated by connecting each of the frequency limit signals 60 to a pull-up resistor, or a pull-down resistor, to cause each of signals 60 to be either a high (or "1") or a low (or "0"), respectively. These resistors can be external to processor 12.

Frequency limit selection circuit 58 operates to select a maximum processor clock frequency based on the data from frequency limiting fuses 59 and/or from frequency limit signals 60. According to one embodiment of the present invention, frequency limit selection circuit 58 comprises four OR gates, where each OR gate performs a logical OR operation on one signal from a fuse 59 and a corresponding signal from signals 60. In this manner, a processor manufacturer can use both pull-up resistors (to set each of frequency limit signals 60 to a high) and/or can program one or more of fuses 59 to select a maximum clock frequency. Alternatively, the maximum processor clock frequency can be selected by only using frequency limiting fuses 59, or by only using resistors via frequency limit signals 60. It may be most convenient for a processor manufacturer to select a maximum processor clock frequency only by programming one or more of fuses 59 (and not using frequency limit signals 60).

Comparator circuit 44 receives a selected processor clock frequency on line 56 from frequency selecting circuit 40, and a maximum processor clock frequency on line 62 from frequency limiting circuit 42. According to one embodiment, the selected processor clock frequency (on line 56) and the maximum clock frequency (on line 62) are each provided as 4-bit digital values. Comparator circuit 44 compares the selected processor clock frequency (on line 56) to the maximum clock frequency (on line 62) to determine if the selected processor clock frequency is a permissible clock frequency. According to an embodiment, the selected processor clock frequency is permissible if it is less than or equal to the maximum clock frequency. Comparator circuit 44 outputs a legal frequency signal on line 64 indicating whether the selected clock frequency is permissible. According to an embodiment of the present invention, comparator circuit 44 outputs a high or a "1" if the selected clock frequency is impermissible, and outputs a low or "0" if the selected clock frequency is permissible.

The "1" or "0" output from comparator 44 can then be stored in register 46. During reset, processor 12 reads the value stored in register 46 to determine if the selected processor clock frequency is permissible. If the selected processor clock frequency is permissible, the processor is allowed to proceed or operate normally. However, if the selected clock frequency is impermissible, the processor 12 is not permitted to operate at the selected clock frequency.

Several different actions can occur to prevent the processor 12 from operating at an impermissible clock frequency. According to one embodiment of the present invention, if the selected clock frequency is impermissible, processor 12 can be simply halted or placed in an endless loop. This action prevents overclocking of processor 12. According to another embodiment, if the selected clock frequency is impermissible, processor 12 can automatically operate processor 12 at a clock frequency that is less than or equal to the maximum clock frequency (and ignore the clock frequency selected by the user). This allows processor 12 to continue operating, but prevents overclocking of processor 12.

The overall operation of overclocking prevention circuit 32 (FIG. 2) according to an embodiment of the present invention will now be briefly described with an example. During chip testing, a processor manufacturer determines that processor 12 can operate without errors up to a clock frequency of 300 MHz. The processor manufacturer does not select a specific clock frequency (e.g., none of fuses 52 are programmed), but the manufacturer does set a maximum clock frequency to prevent overclocking and remarking of processor 12. The processor manufacturer programs one or more of frequency limiting fuses 59 to set the maximum processor clock frequency to 200 MHz for processor 12 to be conservative. Frequency limit signals 60 are not used. Processor 12 is marked and sold as a 200 MHz part. (The 300 MHz part is more expensive). Therefore, the PC manufacturer or user is free to select a processor clock frequency less than or equal to 200 MHz. This may be performed using one or more jumpers on motherboard 11 or through the BIOS. In this example, the user selects a processor clock frequency of 250 MHz.

During reset, the selected processor clock frequency (250 MHz) is provided as digital data by the motherboard 11 and sampled by processor 12 on frequency select signals 16 and is provided as an input to comparator circuit 44. The maximum clock frequency (digital data from fuses 59 indicating a maximum frequency of 200 MHz) is provided as an input to comparator circuit 44. Comparator circuit 44 compares the selected frequency (250 MHz) to the maximum clock frequency (200 MHz) and determines that the selected frequency is impermissible. A "1" is written to register 46 to indicate that the selected clock frequency is impermissible (e.g., is greater than the maximum clock frequency). During reset, processor 12 reads the register 46, and then halts processor 12 because the user has attempted to overclock processor 12.

Figure 3A:
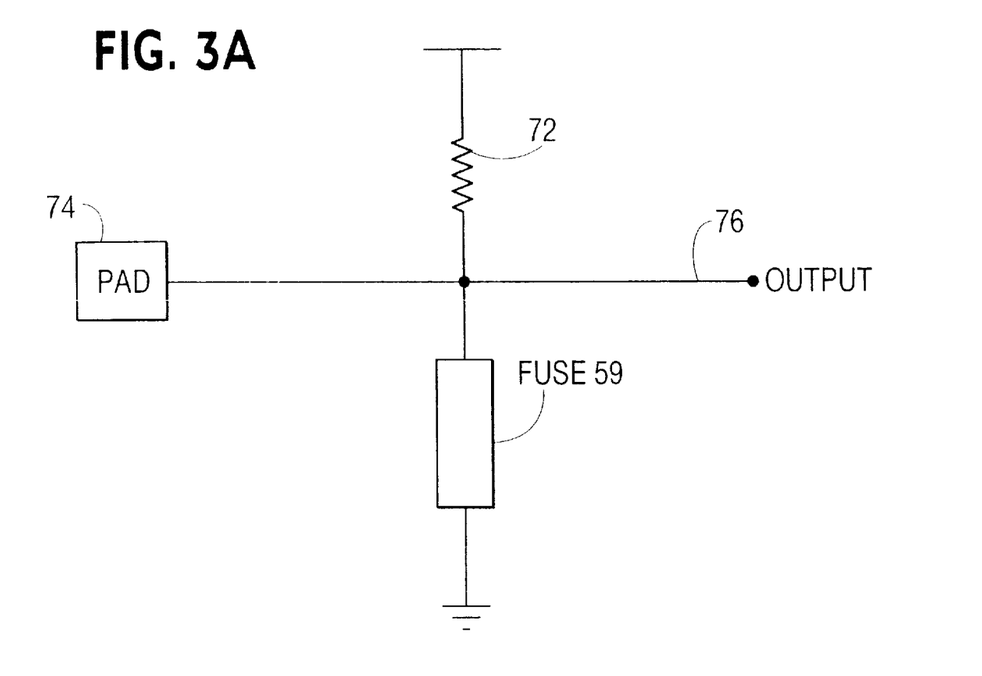
FIG. 3A illustrates an unprogrammed fuse according to an embodiment of the present invention.
Figure 3B:
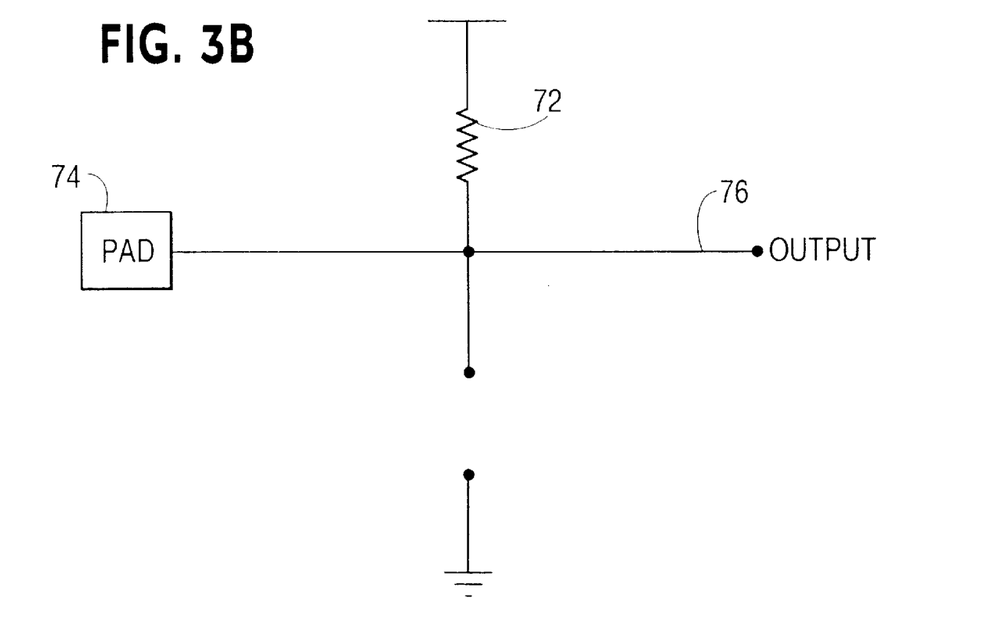
FIG. 3B illustrates a programmed fuse according to an embodiment of the present invention.

FIG. 3A illustrates an unprogrammed fuse according to an embodiment of the present invention. FIG. 3B illustrates a programmed fuse according to an embodiment of the present invention. In FIG. 3A, an upper end of fuse 59 is coupled to a power supply voltage (e.g., Vcc) via a pull-up resistor 72. The lower end of fuse 70 is connected to ground. Fuse 59 can be programmed (or blown) by applying a voltage to a fuse input 74. When fuse 59 is unprogrammed (not blown), fuse 59 short circuits the ground to the power supply voltage via the pull-up resistor 72 to cause the fuse output 76 to be a low (or "0"). Referring to FIG. 3B, after fuse 59 has been programmed (or blown), the output 76 becomes a high (or a "1"). Once a fuse is programmed (or blown), the fuse output is permanently set to a "1" and cannot be unprogrammed. Other fuse structures can be used. Also, other materials (other than polysilicon) can be used to construct the fuses.

Figure 4:
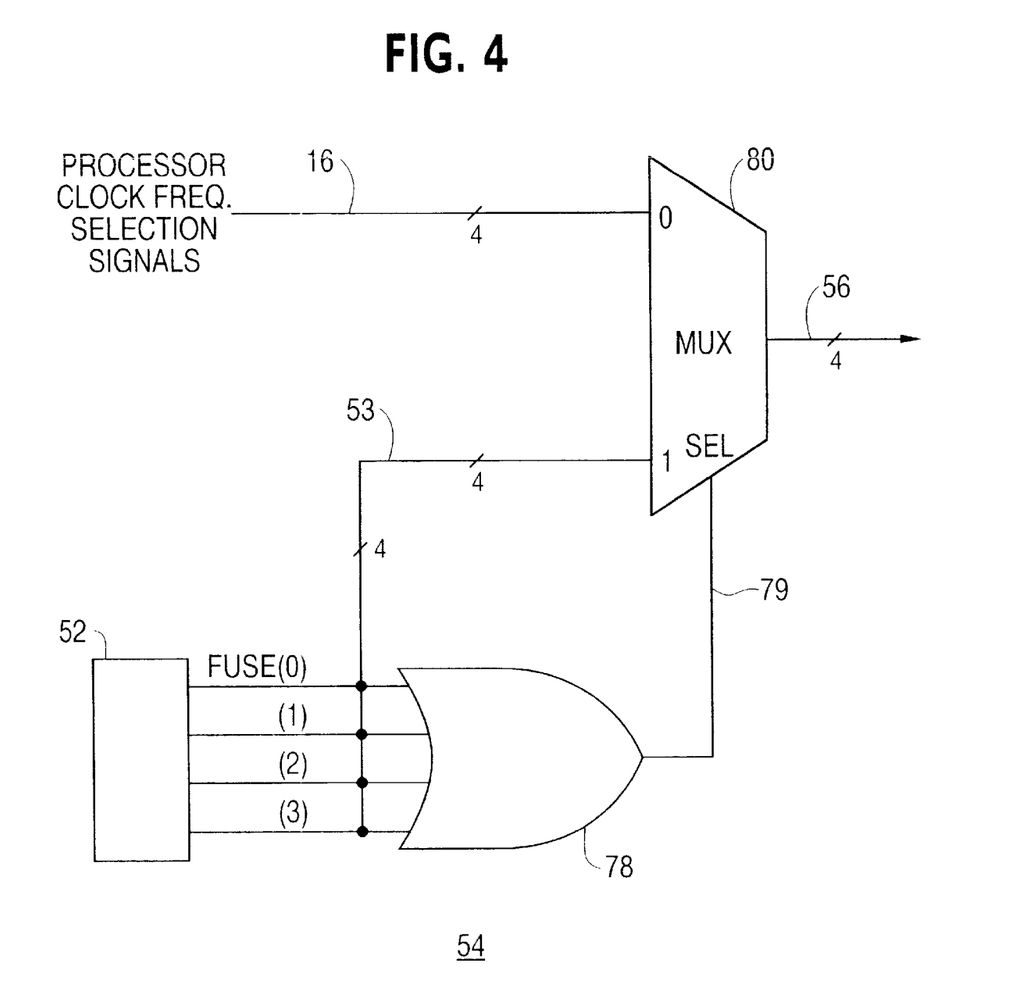
FIG. 4 illustrates a block diagram of the fuse/pin selection circuit of FIG. 2 according to an embodiment of the present invention.

FIG. 4 illustrates a block diagram of the fuse/pin selection circuit of FIG. 2 according to an embodiment of the present invention. Fuse/pin selection circuit 54 includes a four-input OR gate 78 and a multiplexer (MUX) 80. The outputs 53 of the four frequency selection fuses 52 are input as the "1" input to MUX 80, and are each input to OR gate 78. The output 79 of OR gate 78 is input as the select signal for MUX 80. Processor clock frequency selection signals 16 are input as the "0" input to MUX 80. In operation, MUX 80 outputs the selected clock frequency on line 59 as either the frequency selection signals 16 or the data output from fuses 52 based on the select input. If any of the fuses 52 have been programmed, then the fuse output for the programmed fuse will be a "1", causing the output of OR gate 78 to be a "1." In such case, the fuse data from fuses 52 are selected by MUX 80 to provide the selected clock frequency. Otherwise (if none of fuses 52 are programmed), the output of OR gate 78 will be a "0" and MUX 80 selects the frequency selection signals 16 to provide the selected clock frequency.

According to an alternative embodiment of the present invention, the maximum processor clock frequency can be expressed as the ratio of the frequency of the external clock 14 to the maximum frequency of the processor clock 33 (the "Bus Ratio"). It may be convenient to express the maximum processor clock frequency in terms of the Bus ratio, particularly where the external clock 14 is provided from motherboard 11 as one of several external clock frequencies. According to an embodiment of the present invention, the external clock frequency can be selected by motherboard 11 (via an external clock select signal) as either a 66 MHz external clock frequency, or a 100 MHz external clock frequency. The external clock select signal can be provided from motherboard 11 to the frequency limiting circuit 42 to allow circuit 58 to identify the correct maximum clock frequency based on the Bus Ratio and the external clock select signal.

Figure 5:
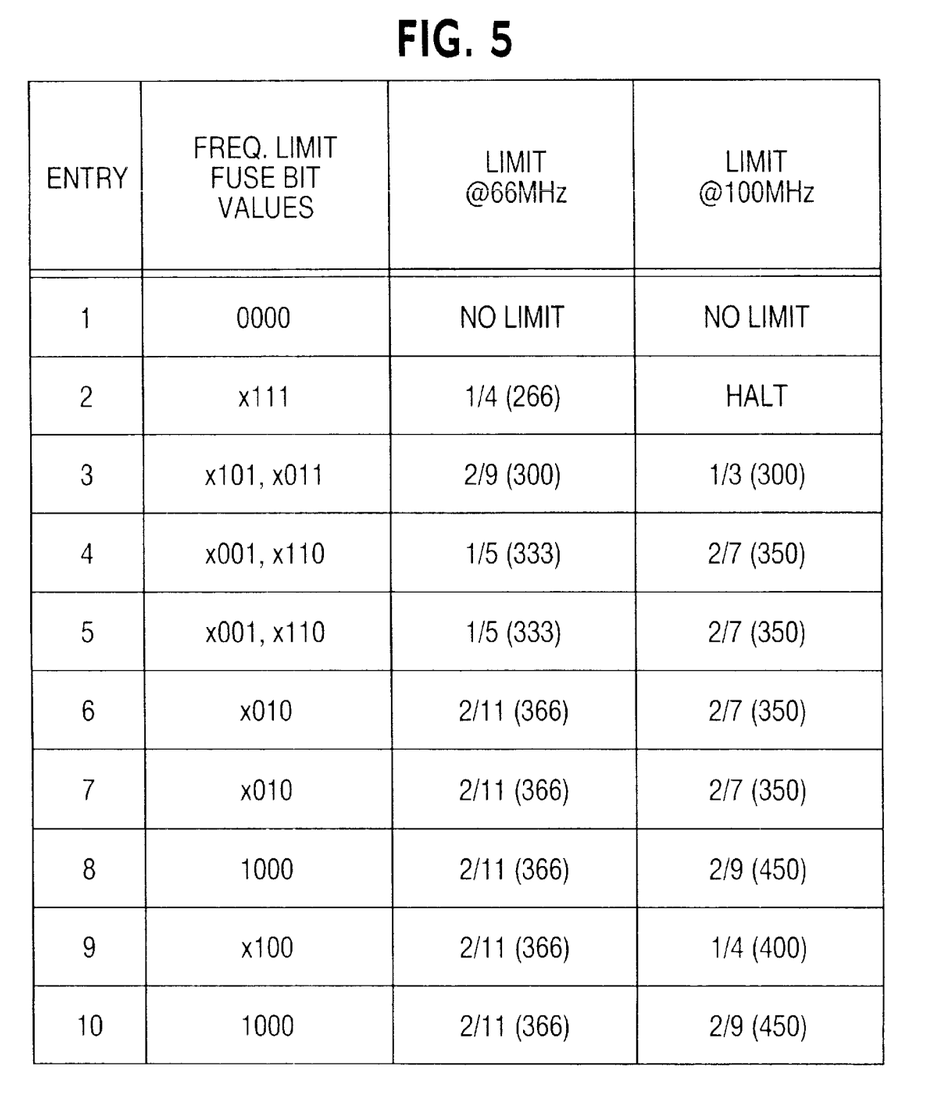
FIG. 5 illustrates the encoding of the frequency limiting fuse bits according to an embodiment of the present invention.

FIG. 5 illustrates the encoding of the frequency limiting fuse bits according to an embodiment of the present invention. The frequency limiting fuse bit values are shown in the first column and indicate the programmed fuse bit data for the frequency limiting fuses 59 for different maximum processor clock frequencies. For each encoded fuse bit value (indicated in the first column), the second and third columns indicate the Bus ratio (and maximum processor clock frequency in parentheses) for the 66 MHz and the 100 MHz external clock frequencies, respectively. For a fuse bit value of "0000" (e.g., where none of fuses 59 are programmed), there is no Bus ratio limit (e.g., there is no maximum processor clock frequency).

Figure 6:
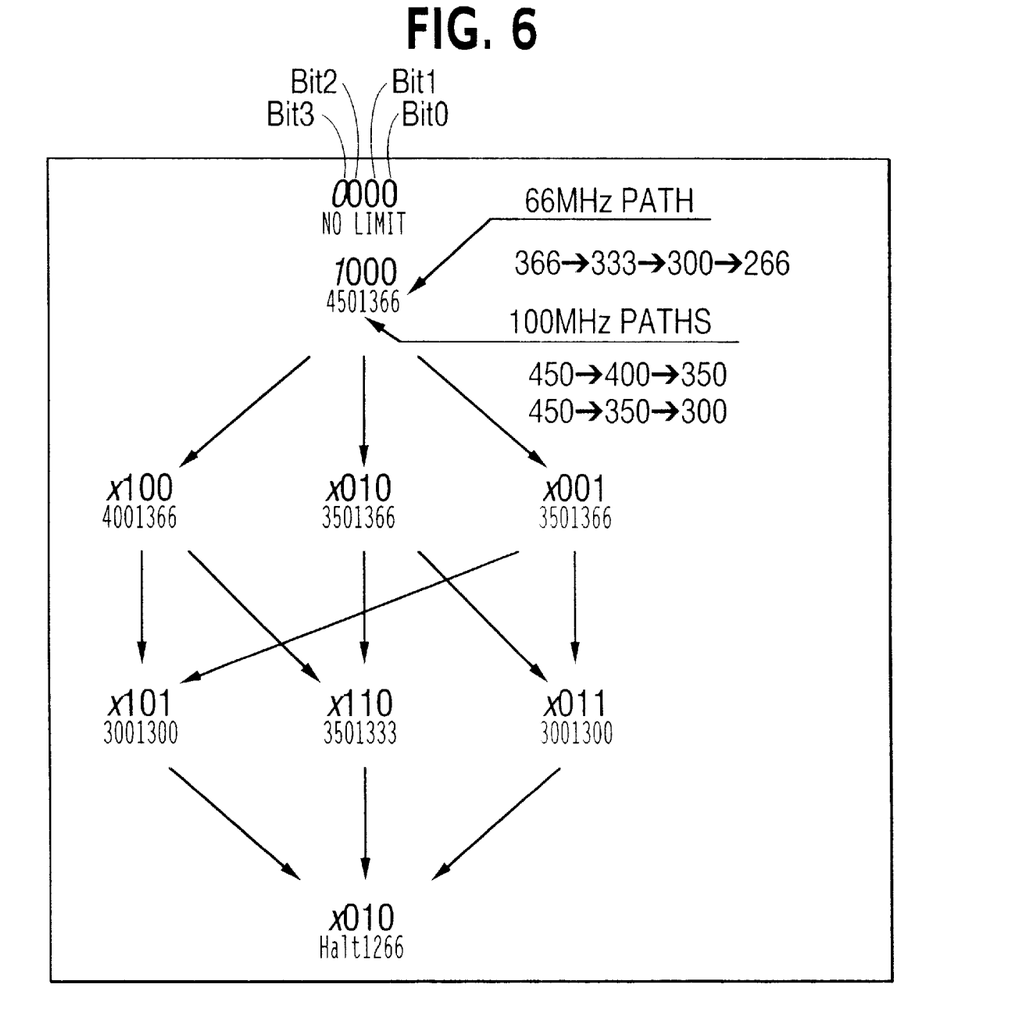
FIG. 6 is a chart illustrating frequency downbin paths according to an embodiment of the present invention.

FIG. 6 is a chart illustrating frequency downbin paths according to an embodiment of the present invention. As shown in FIG. 6, fuse bits for frequency limiting fuses 59 can be successively programmed to successively decrease the maximum processor clock speed, or "downbin" the processor to a slower frequency. In FIG. 6, under each fuse bit value, the left hand clock frequency indicates the 100 MHz path, and the right-hand clock frequency indicates the 66 MHz path. The arrows illustrate how maximum processor clock frequency (or the Bus ratio limit) can be decreased by programming a single fuse in each step along each downbin path.

Initially, at the first step of the downbin path, the frequency limiting fuses 59 are all unprogrammed, which is indicated as "0000", where there is no limit (e.g., no maximum processor clock frequency). According to an embodiment of the present invention, there are 4 fuse bits. When fuse bit 3 is programmed, this fuse bit value (fuse bit value of 1000) corresponds to entry 8 in FIG. 5, which indicates a Bus ratio limit of 2/11 (and a 366 MHz maximum processor clock frequency) for the 66 MHz FSB clock frequency, and indicates a Bus ratio limit of 2/9 (and a 400 MHz maximum clock frequency). Other steps of the downbin path of FIG. 6 similarly correspond to other entries of FIG. 5.

As shown in FIG. 6, after reaching step "1000", either of the 3 unprogrammed fuse bits can then be programmed to proceed to one of the three next possible steps (x100, x010, and x001, where x indicates a don't care bit value) along the downbin path. As shown in FIG. 6, the maximum processor clock frequency can be decreased to successively lower clock frequencies by programming additional fuses 59 (e.g., successive downbinning).

The fuse bit encoding illustrated in FIG. 5 for frequency limiting fuses 59 and the downbinning paths of FIG. 6 have several advantages. First, only one fuse must be programmed to select the next lower maximum processor clock frequency. For example, during a first series of processor tests, a first maximum clock frequency is set by programming one fuse. Successive and more stringent tests indicate that the processor can successfully operate only at lower frequencies. After each of these tests, one or more additional fuses can be programmed to successively select the lower maximum clock frequencies. Second, the fuse bit encoding illustrated in FIG. 5 prevents resellers and users from increasing the maximum clock frequency through the programming of additional fuses. As shown in FIGS. 5 and 6, regardless which maximum clock frequency is selected, programming additional fuses can only select a lower clock frequency. The fuse bit encoding according to an embodiment of the present invention does not allow the selection of a higher maximum clock frequency by programming additional fuses. Therefore, even if a reseller knows how to program fuses 59, the reseller cannot increase the maximum processor clock frequency by programming additional fuses 59. Rather, the reseller will only decrease the maximum processor clock frequency by programming additional fuses 59.

In addition, the fuse bit encoding of FIG. 5 and the downbinning paths of FIG. 6 (used for the frequency limiting circuit 42 and fuses 59) can similarly be used for frequency selecting circuit 40 and for frequency selecting fuses 52.

As described above, the present invention includes an overclocking prevention circuit 32 for preventing the overclocking of a processor. The maximum clock frequency output by frequency limiting circuit 42 is provided to comparator circuit 44 for comparison to the selected processor clock frequency. If the selected processor clock frequency is impermissible (e.g., if the selected clock frequency is greater than the maximum clock frequency), processor 12 is not permitted to operate at the selected clock frequency. As a result, the present invention can prevent processor overclocking.

The present invention provides a mechanism for preventing overclocking that is both secure and flexible. A selected maximum processor clock frequency can be selected by programming one or more of frequency limiting fuses 59 (and/or by using signals 60). This mechanism is secure because the maximum clock frequency cannot be easily manipulated. In particular, programming of additional fuses can only decrease the maximum clock frequency. Moreover, the fuse bit encoding according to an embodiment of the present invention allows successive processor downbinning by successively programming additional frequency limiting fuses 59.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. An apparatus for limiting a processor clock frequency comprising:

a frequency limiting circuit including one or more programmable fusible elements, the frequency limiting circuit outputting a signal identifying a maximum processor clock frequency based on the state of each of the fusible elements;

a comparator circuit coupled to the frequency limiting circuit, said comparator circuit receiving a signal identifying a selected processor clock frequency as a first input and receiving the signal identifying the maximum processor clock frequency as a second input, said signal identifying the selected processor clock frequency being based on at least one of one or more second programmable fuse elements and a multi-bit input signal, said comparator circuit outputting a signal indicating whether or not the selected processor clock frequency is greater than the maximum clock frequency.

2. The apparatus of claim 1 and further comprising a frequency selecting circuit coupled to the comparator circuit, said frequency selecting circuit including the one or more second programmable fuse elements, and generating the signal identifying a selected processor clock frequency.

3. The apparatus of claim 2 wherein said frequency selecting circuit comprises one or more programmable fusible elements.

4. The apparatus of claim 1 and further comprising a memory location for storing information indicating whether or not the selected processor clock frequency is greater than the maximum processor clock frequency.

5. A frequency selecting circuit comprising:

one or more frequency selecting fusible elements which can be programmed to select a processor clock frequency;

frequency selection logic coupled to the fusible elements and receiving as an input a signal identifying a selected processor clock frequency, said frequency selection logic selecting the clock frequency identified by the fusible elements if one or more of the fuses are programmed, and otherwise selecting the clock frequency identified by the received signal.

6. A frequency limiting circuit comprising:

a plurality of fusible elements which can be programmed to select a maximum processor clock frequency; and frequency limiting selection logic coupled to the fusible elements, said selection logic receiving a multi-bit input signal identifying a selected maximum processor clock frequency, said selection logic outputting a multi-bit signal identifying a maximum processor clock frequency based on at least one of the programmed state of each fusible element and the received multi-bit input signal.

7. The frequency limiting circuit of claim 6 wherein said frequency limiting selection logic outputs a signal identifying a maximum processor speed as a logical ORing of the programmed state of each fusible element and the received multi-bit input signal.

8. An apparatus for limiting a processor clock frequency comprising:

an external circuit, said external circuit outputting signals identifying a selected processor clock frequency;

a processor coupled to the external circuit and receiving the signals identifying the selected processor clock speed;

said processor comprising:

an overclocking prevention circuit, said overclocking prevention circuit including a plurality of programmable fusible elements that are programmed to identify a maximum processor clock frequency and receiving inputs identifying a selected maximum processor clock frequency, and a comparator for comparing the programmed maximum processor clock frequency to the selected processor clock frequency, said overclocking prevention circuit preventing operation of the processor at the selected processor clock frequency if the selected processor clock frequency is greater than the programmed maximum processor clock frequency.

9. The apparatus of claim 8 wherein said overclocking prevention circuit comprises a frequency selecting circuit, the frequency selecting circuit receiving the signals identifying the selected processor clock frequency and including one or more second programmable fusible elements that can be programmed to identify a selected processor clock frequency.

10. The apparatus of claim 8 wherein said external circuit comprises a motherboard that outputs the signals identifying the selected processor clock frequency during reset.

11. A method of selecting a processor clock frequency comprising the steps of:

selectively programming fusible elements to encode a first processor clock frequency;

generating a signal selecting a second processor clock frequency;

selecting the first processor clock frequency if at least one of the fusible elements has been programmed, otherwise selecting the second processor clock frequency.

12. A method of limiting processor clock frequency comprising the steps of:

programming one or more fusible element to set a maximum processor clock frequency;

receiving a signal selecting a processor clock frequency;

comparing the selected processor clock frequency to the maximum processor clock frequency; and preventing operation of the processor at the selected processor clock frequency if the selected processor clock frequency is greater than the maximum processor clock frequency.

13. The method of claim 12 wherein said step of preventing comprises the step of halting the processor if the selected processor clock frequency is greater than the maximum processor clock frequency.

14. The method of claim 12 wherein said step of preventing comprises the step of automatically operating the processor at a clock frequency that is less than or equal to the maximum clock frequency if the selected processor clock frequency is greater than the maximum processor clock frequency.

15. A method of setting a maximum processor clock frequency comprising the steps of:

programming a first of a plurality of programmable fusible elements to set a maximum processor clock frequency;

programming one or more additional fusible elements to set a clock frequency, wherein the programming of each said additional fusible element can only set a clock frequency that is equal to or lower than the maximum clock frequency.

16. A method of setting a maximum processor clock frequency comprising the steps of:

setting a first maximum processor clock frequency by programming fusible elements and/or setting bits of a multi-bit input signal; and adjusting the first maximum processor clock frequency to a lower clock frequency by programming one or more additional fusible elements or by setting additional bits of the multi-bit input signal.

* * * * *